(12) United States Patent
Schindler et al.

(10) Patent No.: US 9,718,320 B2
(45) Date of Patent: Aug. 1, 2017

(54) AXLE LINK FOR A MOTOR VEHICLE

(71) Applicant: AUDI AG, Ingolstadt (DE)

(72) Inventors: Sebastian Schindler, Ingolstadt (DE); Guido Fessel, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 146 days.

(21) Appl. No.: 14/772,221

(22) PCT Filed: Feb. 15, 2014

(86) PCT No.: PCT/EP2014/000420
§ 371 (c)(1),
(2) Date: Sep. 2, 2015

(87) PCT Pub. No.: WO2014/135251
PCT Pub. Date: Sep. 12, 2014

(65) Prior Publication Data
US 2016/0031278 A1    Feb. 4, 2016

(30) Foreign Application Priority Data

Mar. 8, 2013    (DE) .................. 10 2013 004 010

(51) Int. Cl.
*B60G 7/00* (2006.01)
*F16C 7/02* (2006.01)
(Continued)

(52) U.S. Cl.
CPC .............. *B60G 7/001* (2013.01); *F16C 7/02* (2013.01); *F16C 7/026* (2013.01); *B60G 21/055* (2013.01);
(Continued)

(58) Field of Classification Search
CPC .............. B60G 7/001; B60G 2202/135; B60G 21/055; B60G 2206/724; B60G 2206/72;
(Continued)

(56) References Cited

U.S. PATENT DOCUMENTS 8,762,000 B2    6/2014   Schindler et al.
9,487,058 B2*  11/2016   Santini ................. B29D 24/002
(Continued)

FOREIGN PATENT DOCUMENTS

CN    101878125 A    11/2010
DE    2845345        4/1980
(Continued)

OTHER PUBLICATIONS

Chinese Search Report issued on Aug. 3, 2016 with respect to counterpart Chinese patent application 201480012722.7.
(Continued)

*Primary Examiner* — Karen Beck
(74) *Attorney, Agent, or Firm* — Henry M. Feiereisen LLC

(57) ABSTRACT

An axle link for a motor vehicle includes a body-side connecting element and a wheel-side connecting element. The connecting elements are connected to one another by a rod element, comprised of a metal rod and a reinforcement casing. The metal rod is made of a ductile material and is anchored in the reinforcement casing at the connecting elements. The reinforcement casing is made of a brittle material and has a predetermined breaking point at a longitudinal position between the connecting elements.

8 Claims, 1 Drawing Sheet

(51) Int. Cl.
  *B60G 21/055* (2006.01)
  *B62D 21/11* (2006.01)

(52) U.S. Cl.
  CPC .... *B60G 2202/135* (2013.01); *B60G 2206/01* (2013.01); *B60G 2206/012* (2013.01); *B60G 2206/013* (2013.01); *B60G 2206/016* (2013.01); *B60G 2206/11* (2013.01); *B60G 2206/7101* (2013.01); *B60G 2206/72* (2013.01); *B60G 2206/724* (2013.01); *B62D 21/11* (2013.01); *F16C 2326/05* (2013.01)

(58) Field of Classification Search
  CPC .. B60G 2206/013; B60G 2206/220601; B60G 2206/016; B60G 2206/11; B60G 2206/012; B60G 2206/7101; F16C 7/02; F16C 7/026; F16C 2326/05; B62D 21/11
  USPC ........................................................ 267/188
  See application file for complete search history.

(56) References Cited

U.S. PATENT DOCUMENTS

| | | | |
|---|---|---|---|
| 2004/0070129 A1* | 4/2004 | Budde | B60G 7/001 267/188 |
| 2013/0099455 A1 | 4/2013 | Beringer et al. | |
| 2013/0187015 A1* | 7/2013 | Quintana Rio | B32B 37/0053 248/200 |
| 2014/0039758 A1 | 2/2014 | Schindler et al. | |

FOREIGN PATENT DOCUMENTS

| | | | |
|---|---|---|---|
| DE | 3827854 | 8/1988 | |
| DE | 3915991 | 11/1990 | |
| DE | 10153799 | 5/2003 | |
| DE | 69836028 | 5/2007 | |
| DE | 10 2006 058 377 | 6/2008 | |
| DE | 102007033763 | 1/2009 | |
| DE | 102011003971 | 8/2012 | |
| DE | 102011007390 | 10/2012 | |
| EP | 0900675 | 3/1999 | |
| FR | 2996199 A1 * | 4/2014 | ............... B62D 7/20 |
| JP | H01171931 | 7/1989 | |
| JP | H11270607 | 10/1999 | |
| JP | H11270608 | 10/1999 | |
| WO | WO2011/141538 | 11/2011 | |
| WO | WO2012/136264 | 11/2012 | |

OTHER PUBLICATIONS

Translation of Chinese Search Report issued on Aug. 3, 2016 with respect to counterpart Chinese patent application 201480012722.7.

* cited by examiner

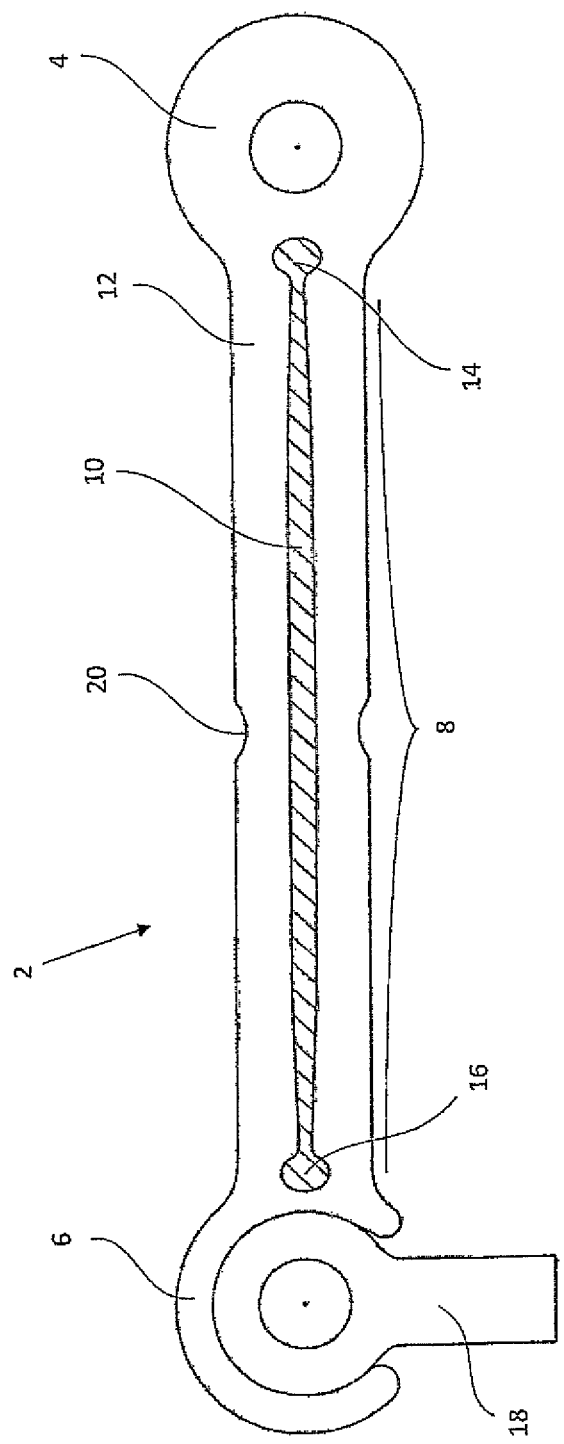

AXLE LINK FOR A MOTOR VEHICLE

CROSS-REFERENCES TO RELATED APPLICATIONS

This application is the U.S. National Stage of International Application No. PCT/EP2014/000420, filed Feb. 15, 2014, which designated the United States and has been published as International Publication No. WO 2014/135251 and which claims the priority of German Patent Application, Serial No. 10 2013 004 010.8, filed Mar. 8, 2013, pursuant to 35 U.S.C. 119(a)-(d).

BACKGROUND OF THE INVENTION

The invention relates to an axle link for a motor vehicle, including a body-side connecting element and a wheel-side connecting element, with the connecting elements being connected to one another by a rod element made from a metal rod and a reinforcement casing of plastic.

DE 38 27 854 C1 discloses a wheel guidance for motor vehicles with a track rod or a wishbone in tubular form, with a transfer rod placed in the tube for transmitting tensile forces and having one end which is held by a force-fitting or form-fitting mount in the tube and another end which projects beyond the tube end. A transfer rod between mount and tube end has a predetermined breaking point and a shoulder between the predetermined breaking point and the tube end, with the tube being provided between shoulder and tube end with a tubular constriction to form a stop for the shoulder, when the predetermined breaking point ruptures, so as to prevent a complete component separation. In a wheel guidance, the tensile force is conducted onward by the track rod or the wishbone via the transfer rod. When the tensile force exceeds a particular limit load, the predetermined breaking point ruptures. As a result, the transfer rod moves with its shoulder up to the tubular constriction, while subject to continuing tensile stress, so that the tensile force can be further transmitted between transfer rod and tube. The change in length of the device causes, however, such a pronounced geometrical modification of the wheel guidance that each driver is unambiguously forewarned by the driving behavior of the motor vehicle.

DE 10 2006 058 377 B4 relates to a Samer rod for the structural reinforcement of a fuselage structure of an aircraft having a shank and eyes arranged at the shank ends on both sides for connecting the Samer rod to the fuselage structure. Pure crash loads are absorbed in crash nets of very low weight with plastic cables. Since the eyes are connected by a reinforcing arrangement, which is formed by a multiplicity of reinforcing fibers, the Samer rod has an adequate mechanical load-bearing capacity in all flight conditions, including the accident situation (crash case). The reinforcing arrangement may be formed as a casing which encloses substantially completely a shank and a threaded rod with the eyes arranged on it.

SUMMARY OF THE INVENTION

Object of the invention is to provide an axle link with energy absorption and an indicating damage mechanism in pull and pressure, wherein the axle link connected by the ductile material ensures an adequate residual service life, allowing a user to visit a workshop.

For this purpose, the axle link according to the invention is characterized in that the metal rod is made of ductile material and anchored at the connecting elements in the casing, and that the reinforcement casing is made of a brittle material and has a predetermined breaking point at a longitudinal position between the connecting elements.

The axle link is thus made of a ductile metal rod as a core and a reinforcement casing of brittle material which provides the necessary rigidity and strength in normal operation. The metal rod is designed such as to become plastic, when the outer reinforcement casing fails as a result of a misuse event, and to be gradually withdrawn thereby from the link. Consequently, the axle link can buckle (pressure) or change its length (pull), which is indicative for the user, for example, by a slanted steering wheel, without leading to a separation of the fragments.

In the axle link according to the invention, the force, required to pull apart the metal rod in relation to the reinforcement casing, can be adjusted in a simple manner via the material of the metal rod and the geometric dimensioning of the metal rod. A further advantage is that the plastic deformation of the axle link results in an energy reduction.

An advantageous configuration of the axle link according to the invention is characterized in that the reinforcement casing is made of fiber reinforced plastic, preferably of carbon fiber reinforced plastic (CFRP).

A further advantageous configuration of the axle link according to the invention is characterized in that the circumference of the metal rod increases from the anchor point at the one connecting element to the predetermined breaking point and decreases from the predetermined breaking point to the other connection element. In this way, the force to pull apart the axle link or ductility of the metal rod can be adjusted in an advantageous manner.

A further advantageous configuration of the axle link according to the invention is characterized in that the force to pull apart the metal rod in relation to the reinforcement casing is to be adjusted by the friction pairing of the materials of the metal rod and the reinforcement casing, wherein the force can be adjusted, in particular, between a large force, caused by rough surfaces on the metal bar and/or the reinforcement casing, and a smaller force, caused by polished surfaces on the metal bar and/or the reinforcement casing, and a minimum force, caused by using oil on the surfaces of the metal rod and/or the reinforcement casing. In other words, the involved force can be adjusted in a wide range depending on the particular application at hand.

A further advantageous configuration of the axle link according to the invention is characterized in that the anchor points of the metal rod are formed by thickenings molded onto the metal rod, wherein the complete slipping out of the metal rod from the reinforcement casing is prevented in a simple manner by a form fit.

A further advantageous configuration of the axle link according to the invention is characterized in that the metal rod is designed as a hollow body which is dimensioned such that it collapses when exposed to rupture stress so as to lose the connection to the reinforcement casing, wherein the friction between the metal rod and the reinforcement casing is removed, so that the two components can easily be pulled apart.

Further advantages, features and possible applications of the present invention will become apparent from the following description in conjunction with the exemplary embodiments illustrated in the drawings.

BRIEF DESCRIPTION OF THE DRAWING

In the description, in the claims and in the drawing, the terms used in the below list of reference signs and associated reference signs are used. In the drawing:

FIG. 1 shows a section through an embodiment of the axle link according to the invention.

DETAILED DESCRIPTION OF PREFERRED EMBODIMENTS

According to FIG. 1, the axle link 2 according to the invention has a body-side connecting element 4 and a wheel-side connecting element 6, configured for attachment of a link 18. The two connecting elements 4, 6 are connected to one another by a rod member 8 comprised of a metal rod 10 and a reinforcement casing 12. The metal rod 10 is made of a ductile material and is anchored in the vicinity of the connecting elements 4, 6 in the reinforcement casing 12 by thickenings 14, 16 molded onto the metal rod 10.

The reinforcement casing 12 is provided to ensure the necessary rigidity and strength of the axle link 2 in normal operation. For that purpose, the reinforcement casing 12 is made of a brittle material, in particular of carbon fiber reinforced plastic (CFRP casing). The reinforcement casing 12 has finally a predetermined breaking point 20 where the axle link 2 according to the invention breaks in the presence of an overload.

In the illustrated exemplary embodiment of the axle link 2, the circumference of the metal rod 10 increases from the anchor point or thickening 14 at the connecting element 4 to the predetermined breaking point 20 and decreases from the predetermined breaking point 20 to the wheel-side connecting element 6. As an alternative, a reverse profile of the circumference of the metal rod 10 can be selected when, for example, the location of the metal rod 10 with the smallest circumference should serve as predetermined breaking point 20 of the metal rod 10.

The force, required to pull apart the metal rod 10 in relation to the reinforcement casing 12, can be adjusted in various ways, in particular by the friction pairing of the materials of the metal rod 10 and the reinforcement casing 12. The force may, for this purpose, be adjusted between a large force, caused by rough surfaces on metal rod 10 and/or the reinforcement casing 12, and a smaller force, caused by polished surfaces on the metal rod 10 and/or the reinforcement casing 12, and a minimum force, caused by the application of oil on the surfaces of the metal rod 10 and/or reinforcement casing 12.

From the standpoint of adjusting the force to pull apart the components, the metal rod 10 may also be configured as a hollow body (not shown), which collapses when subject to rupture stress and thus loses the connection to the reinforcement casing 12.

What is claimed is:

1. An axle link for a motor vehicle, comprising:
   a body-side connecting element;
   a wheel-side connecting element; and
   a rod element connecting the connecting elements to one another, said rod element comprising a metal rod and a reinforcement casing, said metal rod being made of ductile material and anchored at the connecting elements in the reinforcement casing, said reinforcement casing being made of a brittle material and having a predetermined breaking point at a longitudinal position between the connection elements.

2. The axle link of claim 1, wherein the reinforcement casing is made of fiber reinforced plastic.

3. The axle link of claim 1, wherein the reinforcement casing is made of carbon fiber reinforced plastic (CFRP).

4. The axle link of claim 1, wherein the metal rod has a circumference which increases from an anchor point of the metal rod at one of the connecting elements to the predetermined breaking point and decreases from the predetermined breaking point to an anchor point at the other one of the connection elements.

5. The axle link of claim 1, wherein the material of the metal rod and the material of the reinforcement casing are selected such that a force to pull apart the metal rod in relation to the reinforcement casing is adjustable.

6. The axle link of claim 5, wherein the force is adjustable between a large force, caused by rough surfaces on the metal rod and/or the reinforcement casing, a smaller force, caused by polished surfaces on the metal rod and/or the reinforcement casing, and a minimum force, caused by application of oil on the surfaces of the metal rod and/or the reinforcement casing.

7. The axle link of claim 1, wherein an anchor point of the metal rod at each of the connecting elements is formed by a thickening which is molded onto the metal rod.

8. The axle link of claim 1, wherein the metal rod is designed as a hollow body which is dimensioned such as to collapse when subject to rupture stress and to thereby lose a connection to the reinforcement casing.

* * * * *